Feb. 10, 1925.

W. L. GILL 1,526,208

STORAGE BATTERY ASSEMBLY

Filed Jan. 18, 1923

Inventor
Walter L. Gill,
By Shepherd & Campbell
Attorneys

Patented Feb. 10, 1925.

1,526,208

UNITED STATES PATENT OFFICE.

WALTER LAWRENCE GILL, OF SAN BERNARDINO, CALIFORNIA, ASSIGNOR TO GILL STORAGE BATTERY COMPANY, A CORPORATION OF CALIFORNIA.

STORAGE-BATTERY ASSEMBLY.

Application filed January 13, 1923. Serial No. 613,455.

*To all whom it may concern:*

Be it known that I, WALTER LAWRENCE GILL, a citizen of the United States, residing at San Bernardino, in the county of San Bernardino and State of California, have invented certain new and useful Improvements in Storage Battery Assemblies, of which the following is a specification, reference being had therein to the accompanying drawings.

This invention relates to secondary or storage batteries and it has for its object to provide a novel combination and correlation of the several parts of the battery cells by virtue of which ready assemblage of the parts is facilitated and the plates are braced and held against movement by the elements of the battery jar and are additionally maintained in properly spaced relation without the use of separate separators or insulating elements between said plates.

Additionally, it is an object of the invention to provide a battery cell of the character indicated wherein the battery jar is provided with integral spacing and separating elements for the plates in such location that the plates are supported transversely of the jar instead of longitudinally of the jar as is now commonly the practice.

Most of the troubles and defects occuring in storage batteries arise from the presence of insulating material between the plates. Not only does the breaking down of the insulating material cause internal trouble, short circuiting and the like, but even when the insulation is not broken down, its presence presents the internal resistance that is the cause of a battery becoming badly overheated, when short circuited or overworked. It is this overheating that causes buckling of the plates and the ultimate destruction of the battery. Insulating material between the plates is a necessary evil in the ordinary type of battery because, where the plates extend lengthwise of the cell jars instead of crosswise thereof, the plates must be put quite close together, if the jar is to receive the necessary number of them. I avoid this necessity by disposing the plates transversely of the cell jars and this gives me the full length of the jars in which to space my plates, with the result that I am able to space them far enough apart to avoid short circuiting without using any insulating material whatever between them. At first glance it might be assumed that the cutting down of the width of the plates would so reduce their capacity as to reduce the out put of the cell as a whole, but I find that such is not the case. I find that under actual test the removal of the insulating material and the consequent removal of the internal resistance more than compensates for the reduction in the width of the plate.

A further advantage arising from this construction is that a narrow plate will charge much quicker than a wide plate and will also discharge much quicker. I have found from experiments that the narrower a plate is the more rapidly it will charge and hence will discharge more rapidly. The reason for this is that the active material in a grid is not a good conductor of electric current, in fact the active material in a grid is more of a non-conductor than it is a conductor. I have found that a grid which is only two pellets wide will discharge proportionately more of its electrical energy than will a plate which is four pellets wide. Thus the use of a narrow plate is highly advantageous because it cuts down the internal resistance which a greater surface of a wider plate would develop.

In the accompanying drawing:—

Like numerals designate corresponding parts throughout the several figures of the drawing.

Figure 1:
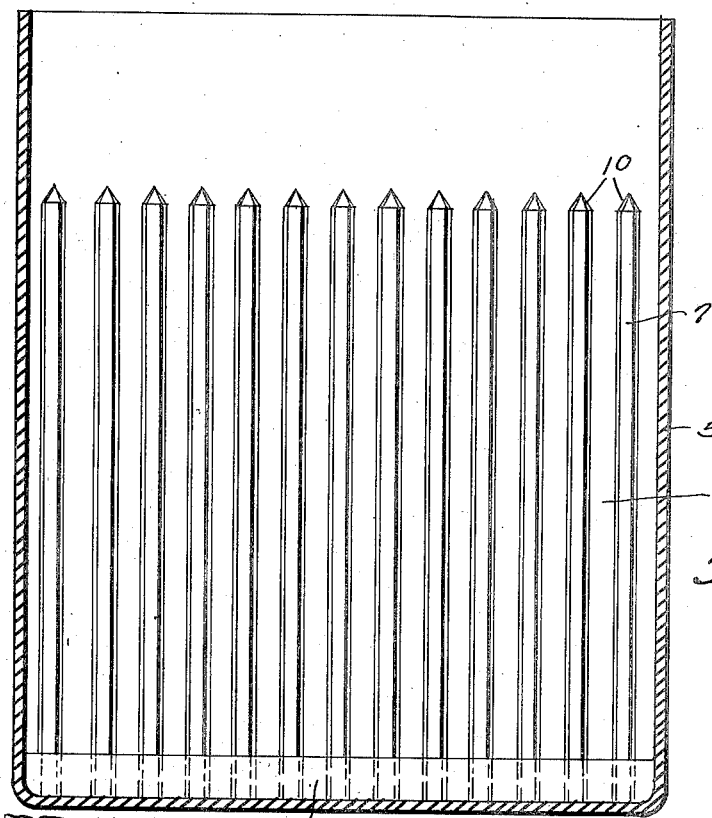
Fig. 1 is a longitudinal sectional view of a battery jar constructed in accordance with the invention.
Figure 2:
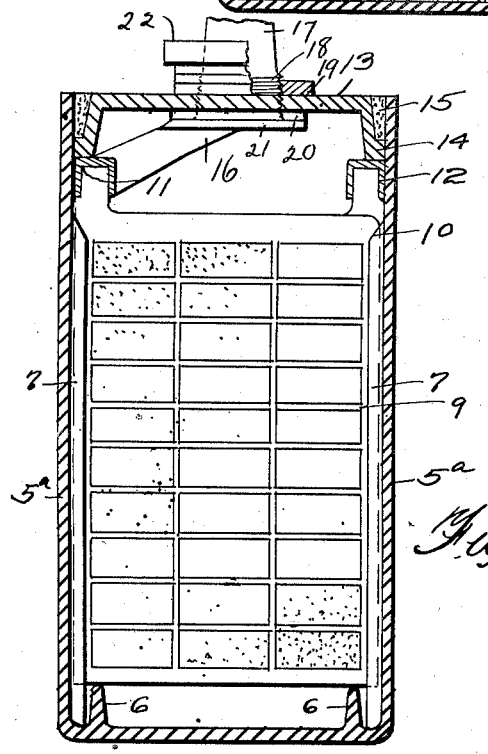
Fig. 2 is a transverse sectional view with the plates in position, and showing the cells sealed.
Figure 3:
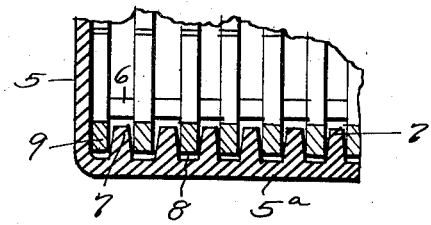
Fig. 3 is a fragmentary horizontal sectional view along one side of the jar.

In the drawing 5 designates the battery jar which has two longitudinally extending upstanding integral ribs 6 formed along its bottom and lying in spaced relation to the sides 5ª. A plurality of vertically disposed ribs 7 extend along the opposite sides 5ª of the jar and taper inwardly to form flaring recesses 8 in which the edges of the plates 9 are received and guided. The upper ends of the ribs 7 are beveled or pointed as indicated at 10 to aid in guiding the plate assembly into the several channels 8 as the banks of positive and negative plates are lowered into the jar. As is well known all of the positive plates are connected to a common connecting strap 11 and all of the negative plates are connected to a common connecting strap 12. When in position the bottoms of the plates rest upon the upstanding ribs 6. The upper ends of the ribs 7 terminate a sufficient distance short of the top of the jar to permit the straps 11 and 12 to lie a sufficient distance below the top of the jar to allow of a cap 13 being fitted within said jar. The top of the cap 13 lies flush with the top of the jar and said cap is provided with an outturned lip 14 which rests upon the tops of the straps 11 and 12, that portion of the cap above the lip lying in spaced relation to the sides of the jar to permit of a sealing compound indicated at 15 being poured about said cap to seal the joint between the cap and jar.

Thus it will be observed that without the use of separate spacing elements the plates are held in properly spaced relation by the ribs 7, are supported upon the ribs 6 and are borne upon by the cap 13. Thus these plates are held rigidly at all points. Furthermore, the inward tapering of the ribs 7 facilitates the ready entry of the plates. This is a feature of importance because with a large number of plates to be guided into position simultaneously, such operation would be a tedious and difficult one unless the ribs are properly shaped to prevent unnecessary binding between the ribs and plates. Furthermore the inward tapering of the ribs facilitates the ready withdrawal of the jar from the mold in manufacture, it being understood that these jars are molded from hard rubber.

Each strap carries an extension 16 (only one of which is shown) and these extensions carry the tapering terminals 17 of the cell. These terminals are threaded at 18 for the reception of nuts 19, rubber washers 20 bear between the under side of cap 13 and a head 21 of the corresponding extension 16. Thus when the nuts 19 are screwed down a tight joint is provided at the point where the corresponding terminal projects through said cap. 22 indicates an ordinary filling plug.

Having described my invention, what I claim is:

In combination, a battery jar materially longer than it is wide having a plurality of integral vertical ribs along its opposite longer sides which terminate short of the top of the jar, positive and negative plates disposed crosswise of the jar and held in spaced relation by said ribs, said positive and negative plates having upwardly extending portions at one of their upper corners, the upwardly extending portions of the positive plates lying along one side of the jar and the upwardly extending portions of the negative plates lying along the other side of the jar, longitudinally extending straps carried by said upstanding portions of the plates and lying close to the sides of the jar, a cap inserted within the jar above said straps the sides of which lie in spaced relation to the walls of the jar and the lower portion of which is provided with an outstanding flange which extends to the wall of the jar and bears directly upon the upper faces of said straps, and a sealing material filling the space between the side walls of the cap and the walls of the jar.

In testimony whereof I hereunto affix my signature.

WALTER LAWRENCE GILL.